April 21, 1953 W. L. FOSTER 2,635,677
SEAT
Filed Nov. 2, 1950
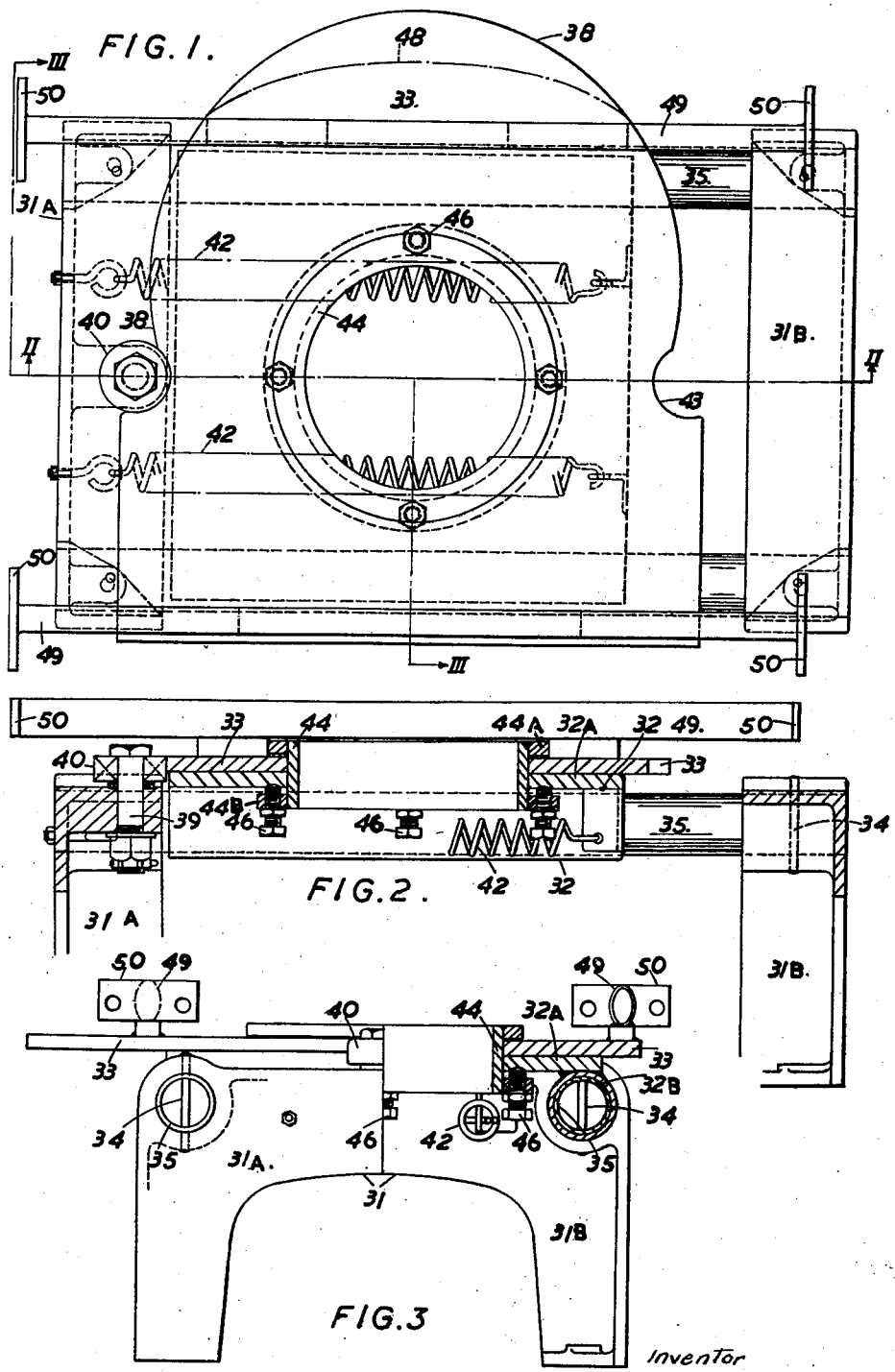
Inventor
William L. Foster
By Shoemaker and Mattare
Attorneys Patented Apr. 21, 1953

2,635,677

UNITED STATES PATENT OFFICE 2,635,677

SEAT

William L. Foster, Slough, England, assignor to G. D. Peters & Company Limited, Slough, England, a body corporate of Great Britain Application November 2, 1950, Serial No. 193,606
In Great Britain July 17, 1950

6 Claims. (Cl. 155—96)

This invention relates to seats of the kind capable of being rotated back and forth through an angle, usually approximately 180°, so as to face in either of two directions.

Such seats are employed principally in rail and other vehicles, and it is desirable that the seats should be located close to the side of the vehicle so as to leave the maximum width of gangway or aisle space. As seats are generally of a rectangular shape in plan, this means that provision must be made for the seat to move away from the side sufficiently to allow the corners of the seat to clear the side when the seat is rotated on a vertical axis from one position to another.

Various devices have been proposed for the purpose of permitting car seats to be rotated on a vertical axis from one position to another close to the side of the vehicle, and it is an object of the present invention to provide an improved, simple, robust and efficient mechanism for this purpose which can be easily and economically manufactured, which has a small number of parts and which is easily assembled or dismantled for repair and maintenance while being reasonably light in weight.

A seat mounting according to the invention essentially comprises a base adapted to be fixed on a support such as the floor of a vehicle or the like near a side or other wall thereof, a turntable for carrying a seat proper which turntable is supported by said base and is rotatable about a vertical axis, a guide—preferably a pair of horizontal parallel rails—on the base restraining the turntable against translatory movement parallel with the wall while allowing free movement in a direction perpendicular or transverse thereto, and means adapted to cause the turntable automatically to move along the guide when it is rotated from one of its normal positions to the other. Said means are such that, when the seat is installed near the wall, the turntable automatically moves away from said wall along the guide during the first half, say 90°, of its total rotation, and effects a return movement during the second half or second 90°.

It is to be understood that the terms "vertical" and "horizontal," as employed herein, refer to the seat mounting when normally installed, e. g. in a vehicle which is in its normal level attitude.

In one form which the mounting according to the invention may take, movement of the turntable along the guide is caused by engagement of a curved cam surface on the turntable with a fixed abutment provided on the base.

One preferred embodiment of the invention will now be described by way of example with reference to the accompanying drawings in which:

Fig. 1 is a plan view of the seat mechanism, and

Figs. 2 and 3 are vertical sections along the lines II—II and III—III of Fig. 1.

Referring now to the drawings, movement of a turntable 33 along parallel guides 35 is caused by engagement of a curved cam surface 38 on the turntable with a fixed abutment 39 provided on the base 31. In this embodiment the turntable 33 is pivotally carried on a carriage 32 slidably mounted on the parallel guides 35, which latter are tubular. The tubular guides 35 bridge a pair of castings 31A, 31B and form therewith the base of the mechanism, the ends of said guides being socketed into the castings and secured in position by transverse locking pins 34.

The carriage 32 includes a horizontal rectangular plate 32A to which are welded a pair of parallel tubes 32B which are mounted on the guides 35 and slide on the latter during translatory movement of the carriage. Near its centre the plate 32A carries a large diameter bearing 44 having a vertical axis and constituted by a bush with welded upper and lower end flanges 44A and 44B, the lower flange being tapped at four places to take adjustment screws 46. These screws may be used to take up wear and in addition they prevent rotation of the bearing.

The turntable is constituted by a horizontal plate 33 on the top of which are welded tubular cross bearers 49 having end plates 50 for attachment of the seat proper. The turntable 33 is formed with a large diameter hole to take over the central bearing 44, on which the turntable is pivoted for its rotary movement.

The abutment 39 is in the form of a vertical pin projecting upwardly from the base 31 midway between the guides 35 and provided with an anti-friction roller 40 where it engages the cam surface 38, the latter being formed on the outer edge of the horizontal turntable plate 33. The plan form of the cam surface 38 approximates that of an arc of about 210° eccentric to the pivotal axis of the turntable 33, and the carriage 32 is urged by tension springs 42 towards the abutment roller 40 to maintain engagement of the cam therewith. At the ends of the cam arc there are rounded recesses 43 one of which takes over the roller 40 in each extreme or normal position in order to act as a stop and hold the seat in said normal position, the turntable 33 being initially released before each change-over by applying to the seat additional torque sufficient to overcome the steep incline of the edge of the recess 43.

In place of the construction shown, the base and guides may be provided as a single integral casting. Moreover the embodiment illustrated may be modified by omitting the springs 42 and forming the cam as a cam-track in which the abutment is received, alternative stop means being provided in place of the two recesses 43. As a further alternative to the track, the pin or cam follower may be forked or otherwise formed to engage both sides of a curved cam rail.

The cam surface or track may have a central portion of lesser curvature to reduce or even eliminate translatory movement of the seat since continued clearance movement is not required in the middle of the rotatory movement of the seat. One such modification of the cam profile is shown by way of example at 48 in Fig. 1. In alternative means for locking the turntable to the base, an upwardly spring-loaded plunger bolt rides in a vertical bore in the base and engages one of two aligning holes in the turntable 33 when it is in one of its two normal positions. The turntable is released by pressure on a pedal or lever connected to the plunger. The locking plungers of a series of seats, for example all the seats of a coach, may all be operated simultaneously, e. g. by electro-magnets connected in a common electric circuit or by pneumatic or hydraulic means subject to a common control, and the seats may, if desired, be rotated by an electric motor or a hydraulic or compressed air power unit.

In any of the embodiments described, the turntable may be provided with clips for the rapid attachment or detachment of the seat proper, and such seat may be a single, twin or multiple seat as desired.

What I claim is:

1. A mounting for a seat of the kind defined comprising a base for securement on a support with one of its ends near a wall, a turntable for carrying a seat proper which turntable is supported by said base and is rotatable about a vertical axis, a guide on the base extending between the ends thereof, which guide allows free movement of the turntable in an endwise direction while restraining the turntable against translatory movement transverse to such direction, a curved cam surface on said turntable, and a fixed abutment on the base in engagement with said cam surface causing the turntable to move along the guide, when it is rotated from one of its normal positions to the other, away from the said end of the base during the first half of its total rotation and towards such end during the second half.

2. A seat mounting according to claim 1 wherein the plan form of the cam surface approximates that of an arc of about 210° eccentric to the pivotal axis of the turntable.

3. A seat mounting according to claim 2 wherein the turntable is pivotally mounted on a carriage slidable along the guide.

4. A seat mounting according to claim 3 wherein the cam surface is constituted by a peripheral edge of the turntable and wherein the carriage is spring-loaded to move in the direction in which the guide extends to maintain the cam surface in contact with the fixed abutment.

5. A seat mounting according to claim 4 wherein the turntable is provided, at the ends of the cam surface, with stop recesses one of which takes over the abutment in each extreme or normal position of the turntable and holds the latter in said normal position.

6. A seat mounting according to claim 1 wherein the guide is constituted by a pair of parallel guide rails which bridge a pair of end base members and constitute therewith the base of the mounting.

WILLIAM L. FOSTER.

References Cited in the file of this patent

UNITED STATES PATENTS

| Number | Name | Date |
|---|---|---|
| 2,063,674 | Hendrickson | Dec. 8, 1936 |